(12) United States Patent
Oetzel et al.

(10) Patent No.: US 10,596,649 B2
(45) Date of Patent: Mar. 24, 2020

(54) HEAT TRANSFER DEVICE FOR PRODUCING A SOLDERED CONNECTION OF ELECTRICAL COMPONENTS

(71) Applicant: PINK GMBH THERMOSYSTEME, Wertheim (DE)

(72) Inventors: Christoph Oetzel, Freudenberg-Boxtal (DE); Sebastian Clärding, Würzburg (DE)

(73) Assignee: PINK GMBH THERMOSYSTEME, Wertheim (DE)

( * ) Notice: Subject to any disclaimer, the term of this patent is extended or adjusted under 35 U.S.C. 154(b) by 105 days.

(21) Appl. No.: 15/529,239

(22) PCT Filed: Dec. 9, 2015

(86) PCT No.: PCT/EP2015/079145
§ 371 (c)(1),
(2) Date: May 24, 2017

(87) PCT Pub. No.: WO2016/091962
PCT Pub. Date: Jun. 16, 2016

(65) Prior Publication Data
US 2017/0326665 A1    Nov. 16, 2017

(30) Foreign Application Priority Data

Dec. 9, 2014   (DE) .................. 10 2014 118 245

(51) Int. Cl.
*B23K 3/00* (2006.01)
*B23K 1/00* (2006.01)
(Continued)

(52) U.S. Cl.
CPC .............. *B23K 3/04* (2013.01); *B23K 1/0016* (2013.01); *B23K 3/085* (2013.01); *B23K 2101/40* (2018.08)

(58) Field of Classification Search
None
See application file for complete search history.

(56) References Cited

U.S. PATENT DOCUMENTS 3,791,018 A * 2/1974 Johnston ................ B23K 3/047
219/85.16
5,717,248 A * 2/1998 Neumann ........... H01L 23/3677
257/706
(Continued)

FOREIGN PATENT DOCUMENTS

DE    10 2007 010 611 A1    9/2008
DE       102007010611 A1 *  9/2008    ............... H01H 1/28
(Continued)

OTHER PUBLICATIONS

Japanese Office Action dated Jul. 24, 2018 for Application No. 2017-529832 with an English translation.
(Continued)

*Primary Examiner* — Devang R Patel
(74) *Attorney, Agent, or Firm* — Birch, Stewart, Kolasch & Birch, LLP

(57) ABSTRACT

A heat transfer device for thermal coupling of a component to be soldered, having a heat source and/or a heat sink in a soldering machine, with at least one base plate which is designed to be in thermal contact at least with the heat source and/or the heat sink. The base plate has a plurality of contact units having a respective contact surface, where the contact surfaces are thermally contactable to the components. The contact units are designed in such a way that the relative distances between the contact surfaces and the surface of the base plate facing the component are changeable. A soldering device, in particular a vacuumable soldering device, is provided having at least one such heat transfer device.

18 Claims, 11 Drawing Sheets

Figure 1:
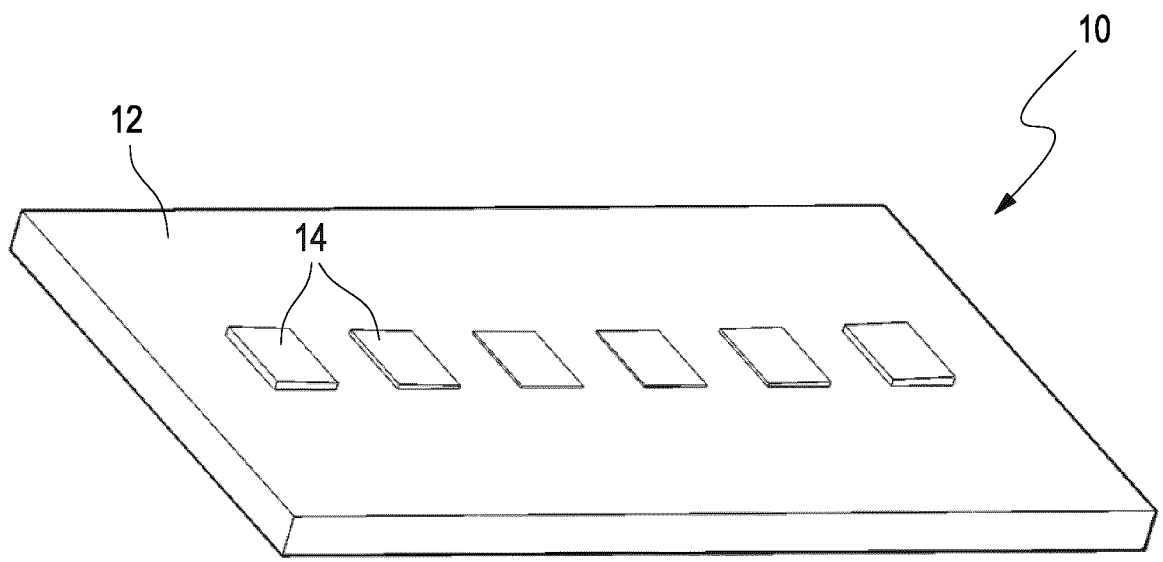

(51) Int. Cl.
*B23K 3/04* (2006.01)
*B23K 3/08* (2006.01)
*B23K 101/40* (2006.01)

(56) References Cited

U.S. PATENT DOCUMENTS

| | | | |
|---|---|---|---|
| 6,053,394 A * | 4/2000 | Dockerty | B23K 1/0016 228/180.22 |
| 6,796,483 B1 * | 9/2004 | Weber | B23K 1/008 228/219 |
| 9,318,828 B2 * | 4/2016 | Sohn | H01R 13/08 |
| 2009/0250154 A1 * | 10/2009 | Nagano | H01L 23/49811 156/73.5 |
| 2013/0199767 A1 * | 8/2013 | Karidis | H01L 24/72 165/185 |
| 2015/0321278 A1 | 11/2015 | Matsuda et al. | |

FOREIGN PATENT DOCUMENTS

| | | |
|---|---|---|
| DE | 10 2011 081 606 A1 | 2/2013 |
| GB | 1 363 710 A | 8/1974 |
| JP | 2001-144429 A | 5/2001 |
| JP | 2010-125486 A1 | 6/2010 |
| JP | 5257149 B2 | 8/2013 |
| WO | WO 2014/115583 A1 | 7/2014 |

OTHER PUBLICATIONS

International Search Report (PCT/ISA/210) issued in PCT/EP2015/079145, dated Apr. 14, 2016.
English translation of the International Preliminary Report on Patantability (Forms PCT/IB/338 and PCT/IPEA/409), dated Jun. 15, 2017, for International Application No. PCT/EP2015/079145.

* cited by examiner

HEAT TRANSFER DEVICE FOR PRODUCING A SOLDERED CONNECTION OF ELECTRICAL COMPONENTS

The invention relates to a heat transfer device according to the preamble of claim 1 which can be employed in the production of soldered joints in, for example, a soldering machine.

In order to achieve an optimum soldering result, above all when soldering large areas, the molten solder, together with the solder partners or components that are to be joined, should be heated in a controlled manner above the melting point of the solder, and then cooled down in a controlled manner below the solidification point in order to join the solder partners together without cavities.

PRIOR ART

The terms "components" and "solder partners" refer in general to substrates, substrate carriers, bottom plates, workpiece carriers, assembly carriers or the like made of metal, ceramic, plastic or other materials, or any other combinations of materials, as well as components that are to be fastened to them such as power semiconductor chips, (semi-)conductor assemblies or the like.

Large-area soldered joints in this context refer, for example, to soldered joints with which, for example, power semiconductor chips such as, for example, IGBTs, MOSFETs or diodes are soldered to metallised ceramic substrates, or with which metallised ceramic substrates are soldered to metal bottom plates for a power semiconductor module.

A soldering machine with a heat transfer device designed as a cooling device for cooling the still-liquid solder of at least one large-area soldered joint to be made can preferably comprise an evacuable chamber, a holder arranged in the evacuable chamber, as well as a heat sink arranged in the evacuable chamber. This allows a soldering process to be carried out under vacuum or under a definable process gas atmosphere in order to exclude contamination or oxidation processes.

A metal plate acting as a test body can be placed in the holder, with which plate the mode of operation of the cooling device can be tested and checked. The metal plate has a lower main surface, an upper main surface that is at a distance in a vertical direction from the lower main surface, as well as an initial temperature of at least 200° C. A number of N≥1 adjacent, rectangular surface segments each with an area of at least 30 mm×30 mm or each of at least 50 mm×50 mm can be fastened to the upper main surface.

A workpiece carrier or the metal plate can now be cooled in the chamber with the aid of a heat sink. An atmosphere primarily of nitrogen at a pressure of around 1013.25 hPa can be used in the chamber as a reference for the cooling effect achieved on the metal plate. The cooling operation can, however, also be carried out wholly or in part at any other desired pressures, for example at negative pressure, e.g. at an absolute pressure which can, for example, be in the range from 1 hPa up to 1030.25 hPa, and/or also partially at overpressure, i.e. at an absolute pressure of more than 1013.25 hPa. Independently of this, the cooling can be carried out in any desired atmosphere, for example in the air or in an atmosphere of protective gas that prevents oxidation of the solder partners, for example in a nitrogen ($N_2$) atmosphere, a carbon dioxide ($CO_2$) atmosphere, a hydrogen ($H_2$) atmosphere, a helium (He) atmosphere or a forming gas ($N_2H_2$) atmosphere.

The cooling of the metal plates with the help of the heat sink is done in such a way that the temperature at the upper main surface of any of the rectangular surface segments does not exhibit a local maximum that is at a distance from the edge of the surface segment concerned, and that this remains true until a minimum cooling temperature of more than 200° C. or of more than 150° C. is no longer present in any of the surface segments. If the solder has sufficiently solidified at, for example, 200° C. or, for example, at 150° C., then a finished, joined solder connection is present between the solder partners. In the real manufacturing process, one of the solder partners can be positioned, fitting precisely into the holder as the lowest solder partner, and one or a plurality of further solder partners can be placed on this, where solder is also placed between each of the solder partners that are to be joined. The solder can, for example, be a pre-formed solder platelet ("solder preform"), or a solder paste that is applied to the joint surface that is to be joined to the other solder partner on one or both of the solder partners that are to be joined.

Instead of positioning one of the solder partners as the lowest one, fitting precisely into the holder, it can also be placed on a carrier plate which is inserted, precisely fitting, into the holder. The other solder partner or partners is or are placed in the same manner as described above, together with a solder platelet or an applied solder paste, onto the lowest solder partner. In this variant it is also possible for a plurality of groups with two or more solder partners, each of which are to be joined together, to be placed in the same manner next to one another on the common carrier plate. The carrier plate is not a part of the soldered assembly once the soldering process has been completed.

The cooling device can, for example, be a part of a soldering machine, with the aid of which the solder product can be cooled in an evacuable chamber of the cooling equipment, as explained above, after it has been heated by means of a heating device in the evacuable chamber or in a separate heating chamber until above the melting point of the solder, so that the solder melts. When a separate heating chamber is used, a lock can be provided between this and the evacuable chamber of the cooling device, as well as a transport device with which the solder product that has been heated above the melting point of the solder being used is transported from the heating chamber into the evacuable chamber of the cooling device. A pre-heating chamber, a solder chamber and a cooling chamber can nevertheless be provided, each of which can be separated from the others by gas-tight locks or mechanically, through which a component to be soldered can be carried via a transport device.

For example, a generic heat transfer device according to DE 10 2011 081 606 A1 designed as a cooling device is known from the prior art. The heat transfer device is configured to provide a defined heat distribution over the components to be soldered by means of cold air. An arrangement of cold air nozzles or a cold air screen with a plurality of openings is provided for this purpose, in order to create a desired temperature gradient on a copper plate. Alternatively, a heat sink can also be provided which can comprise a non-homogeneous heat conductor, or which has cooling elements arranged next to one another and movable independently of one another in a vertical direction, including being nested within one another. The cooling principle is based on gas convection, and requires active components for the provision of a circulating gas, where cooling under vacuum cannot be provided. A controllable, partial and full-area cooling possible is also not possible by changing the distance. The copper plate that is arranged between the cooling nozzles/cooling elements and the components to be soldered effects a homogenisation of the temperature distribution, so that a defined temperature gradient cannot be provided.

In practice, assemblies or components that are arranged on curved or bent bottom plates are often soldered. Bottom plates also warp when heated or cooled, so that as a rule the soldering process must be carried out on a curved bottom plate. The bottom plate acts as an assembly carrier for the assembly, for example a semiconductor assembly for high-power applications such as, for example, converters such as rectifiers or inverters in a motor or generator application. An example for such applications is a converter in a wind turbine. Wind turbines of this type are also increasingly installed at sea ("offshore"), which places high demands on the reliability of all the components, since servicing and repair involves a higher servicing expense in comparison with turbines installed on land. Due to the magnitude of the electrical power to be transmitted, the soldered joints are subjected to particular stress, and the requirements on the soldering quality are therefore extraordinarily high. It is essential that soldering faults such as cavities, cracks or the like are prevented in order to avoid expensive repairs and wind turbine downtime resulting from failed converters.

In power applications of this sort, the bottom plate also serves the function of a heat sink in order to dissipate excess heat from the assembly and to cool the assembly. Finally, the bottom plate can also act as a common ground connection in order to provide an electrical reference potential for the component carrier(s). For this reason the bottom plate is manufactured from a thermally conductive material, often of metal.

In the electrical power engineering field, in particular in the case of a three-phase application, 3, 6 or a multiple of 3 assemblies can be soldered onto one bottom plate. The components, or groups of components, comprise one or more substrate carriers, made for example of ceramic or plastic, which have a solderable metallisation on the rear face, and which are connected both electrically and thermally over their full area or at points to the bottom plate by a soldered connection. This gives rise to the problem that in the soldering process, which can be associated with a high temperature gradient, the bottom plate and the assembly substrate undergo different expansions, whereby a mechanical warping of the overall component results, similarly to a bimetal strip. Thermally generated bending deviations of the bottom plate with respect to a horizontal reference surface of 0.3 mm or more are reached. A relatively high rate of cooling is important, in particular for the process technology, in order to maintain a sufficiently high temperature difference within the solder deposit. This allows solder that is still liquid to flow into regions that have already solidified. At low rates of cooling, the temperature is homogenised over the entire product, so that this effect cannot be used. It is desirable here for cooling rates of 2 K/s or more to be achieved, also in order to achieve a high rate of component throughput in the soldering machine.

In order to counteract thermally generated warping when making a soldered joint between different materials, the bottom plate is pre-formed in some way, usually pre-bent, such that after the soldering and the solidification of the soldered joint, the component as a whole has a planar alignment. This gives rises to the problem that components and assemblies are soldered onto a curved bottom plate or component carrier, and must be heated or cooled in a controlled manner. The heating process is particularly important here, since high mechanical stresses, which have a disadvantageous effect on the quality of the soldered connection, occur when different materials cool down.

It is the object of the invention to propose a heat transfer device that achieves the following:
heating curved components or bottom plates homogeneously over the full area;
influencing the solidification process in a controlled manner by locally limited cooling and heat retention, so that cracks do not occur in the solder; and
permitting a changeover to large-area cooling after solidification of the solder, in order to shorten the process time.

The object of the present invention is to provide a heat transfer device for the controlled heating and/or for the controlled cooling of the still-liquid solder of a large-area soldered connection that is to be made.

This object is achieved by a heat transfer device having the features of claim 1.

Embodiments and developments of the invention are the subject matter of dependent claims.

DISCLOSURE OF THE INVENTION

According to the invention, a heat transfer device is proposed for thermal coupling of a component to be soldered, comprising a heat source and/or a heat sink in a soldering machine, having at least one base plate which is designed to be in thermal contact at least with the heat source and/or the heat sink. The base plate has at least two, in particular a plurality, of contact units having a respective contact surface, where the contact surfaces are thermally contactable to the components. The contact units are designed in such a way that the relative distances between the contact surfaces and the surface of the base plate facing the component are changeable.

The invention is based on the idea of specifically establishing a thermal contact to the heat source or to the heat sink, or to the base plate that is connected thereto, through at least two, in particular a plurality, of contact units, so that only specific respective regions of the thermally contacted component are heated or cooled. The selective cooling/heating effect is based on cooling/heating of the contact, which can provide a cooling/heating effect with pinpoint accuracy and a high temperature gradient. It is thus not the entire base plate which comes into thermal contact with the component, but only the partial regions which have the contact units, where a heating and/or cooling of the component occurs in the region of the contact surfaces of the contact units. As a result of the changeability of the relative distances between the contact areas underneath the surface of the base plate facing the component, non-planar components such as the aforementioned curved bottom plates can be reliably contacted, so that the distances of the contact areas can be adapted to the contour of the component to be contacted. This creates multi-point contacting, which is advantageous in particular when soldering under vacuum, since in that case a bridging of possible gaps between the base plate and the component as a result of convection when soldering under ambient pressure does not occur. The mechanical implementation is relatively simple, and the cooling/heating effect can be achieved under vacuum and without convection.

Advantageously here, the relative distances between the contact areas and the surface of the base plate facing the component are changeable against a spring force and/or positioning force exerted by the respective contact units. This can, for example, be achieved in that the contact units comprise spring elements or are manufactured of an elastic material, which will be explained in further detail below. In principle, however, it would also be sufficient for a function of the heat transfer device if the base plate were to comprise generally protruding contact surfaces which is contactable even without a relative change in the distance from the component.

The contact surfaces of the contact units can be plane or curved, where the said relative distance relates in the case of curved contact surfaces to a point on the contact surface that has the greatest distance from the base plate. The heat transfer device according to the invention can, in principle, be employed independently of orientation, so that a lower face, an upper face, or even the lower and upper faces of the component(s) can be thermally contacted. This means that corresponding orientation designations such as "upper" or "lower" in this application are not restrictive, but relate to the respective exemplary embodiment and to the figures.

According to an advantageous embodiment of the invention, the distance between the base plate and the component is changeable, where the contact units are designed such that the relative distances between the contact surfaces and the surface of the base plate facing the component are changeable depending on a change in the distance between the base plate and the component, in particular depending on a change caused thereby in the contact pressure with which the base plate is pressed against the component. The relative change in the distance between the contact surfaces and the base plate can here be achieved through the elasticity of the contact units already mentioned above. This makes it possible to change the relative distance for each contact unit independently of other contact units. A reliable thermal contact is thus also assured for such components not having a planar contour, or which deform during the soldering process as a result of thermal processes.

Advantageously, the contact units can be held repositionable in recesses that are provided in the base plate, where in particular the contact units can be repositioned into a retracted position in which the contact surfaces of the contact units are flush with the surface of the base plate facing the component. The repositionability of the contact units can in particular be achieved in that the contact units comprise spring elements, or are manufactured of elastic material. The repositioning of the contact units can furthermore also be achieved with the aid of suitable adjusting means, for example by mechanical, pneumatic, electromagnetic or hydraulic adjusting means. By the possibility of repositioning the contact units into the said retracted position, it can be arranged that the component, or a carrier plate on which the component is mounted and that is in thermal contact with the component, is thermally contacted over a large area, i.e. is also able to heat or cool regions of the component which, outside the retracted position, are not in contact with the contact surfaces. In the retracted position, the relative distance between the contact surfaces and the surface of the base plate facing the component is thus zero.

According to a further advantageous embodiment, the contact units are formed of an elastic and thermally conductive material, in particular a metal paste, an epoxy resin incorporating metal particles, e.g. particles of silver, and/or a conductive elastomer material, that is provided on the side of the base plate facing the component to be soldered. The contact units are here formed by so-called pads which can have any desired form and/or size, where the form and/or size can also vary from one contact unit to another. Contact units of this sort can be manufactured economically, and in particular permit an individual adaptation to different components to be soldered with only small manufacturing effort.

According to yet another advantageous embodiment, a respective contact unit comprises a contact pin having contact surfaces and adjustable relative to the base plate. The contact pin can itself be rigid and preferably consists of a material with good thermal conductivity such as aluminium or copper. The cross section of the contact pin can be round or polygonal, in particular square. It is furthermore possible to give the contact pin a coating of gold or silver.

In this context, it has been found advantageous if an elastic and thermally conductive material, in particular an epoxy resin incorporating metal particles and/or a conductive elastomer material, is applied to an end face of the contact pin. This ensures that the entire end face of the contact pin, or at least a large proportion of the end face, can come into thermal contact with the component, even if the contact pin and the component, as a result of design and/or fabrication circumstances, are angled with respect one another, so that without the applied thermally conductive material only a partial contact over a small area between the contact pin and the component would be possible. In that case, the thermally conductive material forms the contact surface.

The contact pin is advantageously spring-mounted, where the mounting can be, for example, onto the base plate, or onto a heat source and/or heat sink that is thermally contactable by the base plate.

In this connection it has been found to be advantageous if a respective contact pin has a thermally conductive sleeve closed on one side, whose closed end face faces the component to be soldered, and that a spring, in particular a helical spring, is housed in the sleeve, said spring protruding, at least when uncompressed, partially out of the open end face of the sleeve and is thermally in contact with the sleeve, where in particular a thermally conductive stud is held in an interior of the spring at its free end that protrudes from the sleeve, said stud being thermally connected to the spring, where advantageously an end face at the end of the stud is flush with the end face of the free end of the spring or protrudes out of the spring. The sleeve preferably has a cylindrical cross-section. The closed end face can incorporate the contact surface. At its end face, the stud can be connected to a heat source and/or a heat sink, or may be fastened to it. The stud improves the transmission of heat to the spring, and can at the same time act as an end stop for the sleeve, and so limit the spring movement.

As an alternative to the previous embodiment, a respective contact pin can have a thermally conductive stud, whose end face faces the component to be soldered. At the lower end axially opposite to the end face of the stud, a spring, in particular a helical springs, can be held on a spring tab of the stud. At its side facing away from the spring tab of the stud, the spring can rest on a contact plate, preferably together with other contact pins. The stud can have a radial projection at the seat of the spring tab which, when the spring is uncompressed, is supported against a radial constriction of the recess of the base plate. A contact pin of a contact unit is thus proposed which has a stud of a thermally conductive solid material. The stud has a contact surface that faces a component to be soldered and which can contact this thermally, and which has a spring tab at an axially opposite end which acts as a seat for a contact spring for sprung contact with the underside of the component. The spring is supported on a contact plate on which a plurality of contact pins of a contact unit can be arranged. A contact unit with a plurality of contact pins can thus be preassembled on a contact plate and subsequently pushed into recesses of a base plate. The contact plate can establish a thermal coupling to a heating or cooling plate arranged underneath the base plate, so that, for example, the temperature of the base plate is selectable different from a temperature of the contact unit. A radial protrusion at the transition from the spring tab to the stud limits the contact movement of the contact pin in the direction of the component at a radial constriction of the recess of the base plate, and the distance from the end face of the spring tab of the stud to the contact plate limits the entry distance of the contact pin.

In this way, different embodiments of contact units are proposed which, with a compact construction, exhibit a very good thermal conductivity and at the same time permit the desired change in the relative distance between the contact surface and the surface of the base plate facing the component.

Advantageously, a thermal capacity of a contact unit, in particular of each contact pin, is configured such that, in relation to the contact area between the contact unit and the component, a quantity of heat for a temperature difference between the solder temperature and the solidus temperature of a solder mass can be absorbed as quickly as possible, preferably instantaneously. The thermal capacity is the ratio between the heat energy supplied to the resulting rise in temperature, and, in relation to a contact unit or a contact pin, is to be configured appropriately for the chosen material, i.e. a specific thermal capacity and a mass, in such a way that, for example at a solder temperature of 250° C. and a solidus temperature of 221° of a mass of solder, a corresponding temperature difference can be withdrawn from the component solder as instantaneously as possible on contact between the contact unit and the component, and said solder brought to solidification. In this embodiment, a thermal contact between the contact unit and the base plate plays less of a role for cooling or heating than the thermal storage capacity of the contact unit itself, which is finally reflected in the weight and material chosen for the contact unit. As a rule, a contact pin can consist of solid copper or other material with good conductivity. Advantageously, the contact unit can comprise a phase change material (PCM), which fixes a contact temperature and permits instantaneous cooling or heating when contacted. A high temperature gradient can be reached in this way, and an optimised adjustment of the solder solidification behaviour from an inner region of the solder deposit to an outer region when cooling, or a melting behaviour from the outside to the inside of the solder deposit, can be achieved. A thermally conductive connection between the contact unit in the base plate plays a role in particular when changing from one component to the next in re-establishing an initial temperature of the contact unit.

According to an advantageous embodiment of the invention, the contact pins are mechanically, pneumatically, hydraulically or electromagnetically adjustable. Instead of the aforementioned passive adjustability of the contact pins or contact unit through the use of elastic material or spring elements, an active control of the contact pins by means of an actuator is thus also possible. A respective contact pin can here be separately adjustable, or it is possible for a plurality of contact pins to be arranged elastically or rigidly on a contact unit carrier which is adjustable relative to the base plate.

According to a further embodiment of the invention, the contact pins are arranged in at least one group, each comprising a plurality of contact pins, where, in an uncompressed state, in particular the relative distances of the contact surfaces of the contact pins of a group to the base plate decrease from the inside to the outside in relation to the positions of the contact pins in the group, An uncompressed state refers to a state in which there is no compressive force acting between the contact pins and the component and/or a carrier plate that is in thermal contact with the component, or there is no pressure on the contact pins from a pneumatic, hydraulic or electromagnetic actuator. With this embodiment it is possible to ensure that, depending on the distance between the components or carrier plate and the base plate, the effective contact area of the group of contact pins can be changed. As the base plate approaches the component or carrier plate, only one contact pin or a small number of contact pins initially come into contact with the component or carrier plate. With a decreasing distance between the component or carrier plate and the base plate, contact pins that are further out in the group enter one after another into thermal contact with the component or carrier plate. The different distances in the uncompressed state can, for example, be achieved by the use of contact pins of different length, i.e. by sleeves and/or helical springs of different length. The contour of the group can be matched to the components that are to be soldered; for example the perimeter of the group can be circular or polygonal.

Advantageously, the base plate is curved on its side facing the component to be soldered, and in particular has a form that is complementary to the component that is to be soldered, or to a carrier plate carrying the component that is to be soldered. In this way, it is ensured that the contact units can come as simultaneously as possible into contact with the component or carrier plate, without the contact units having to have different lengths. If the contact units can be placed into a lowerable retracted position, then the curvature of the base plate can make it possible for the base plate to be able to enter into contact as far as possible over the full area with the component to be soldered or with the carrier plate.

It has been found advantageous if the heat transfer device furthermore comprises the heat source and/or the heat sink, where the base plate is in thermally conductive contact with the heat source and/or the heat sink. The base plate can, for example, optionally be in contact with the heat source or with the heat sink, or can also form one structural unit with a heat source or with a heat sink, It is furthermore possible for the heat source and the heat sink to be combined into one device. The respective function as heat source or as heat sink can, for example, be achieved in that a cooling agent or a heating agent can selectively flow through this device, or a heating device can be activated.

Advantageously, a temperature-resistant fluid, for example a liquid metal, in particular liquid solder, thermal oil including silicon oils or highly thermally conductive elastomers, can be employed as the heating or cooling agent. A phase change material can also be employed in the base plate or in the contact unit. A connection between the contact unit and base plate can, for example, be established by a preformed platelet that melts at a solidus temperature and thus represents a kind of phase change material. The thermal resistance between the contact unit and the heat source/sink can be optimised in this way.

The present invention relates in a subsidiary aspect to a soldering machine with at least one heat transfer device that comprises the heat source and/or the heat sink, where the base plate is in thermally conductive contact with the heat source and/or the heat sink, and with a component holder in which at least one component to be soldered is fixable, where the component holder and the base plate are repositionable relative to one another in such a way that as a result the contact surfaces of the contact units can optionally make thermally conductive contact to the component to be soldered, and the relative distances between the contact surfaces and the surface of the base plate facing the component are changeable. The soldering machine can, in particular, comprise several heat transfer devices where, for example, a heat transfer device is designed as a heating device and is in contact with a heat source, and a further heat transfer device is designed as a cooling device and is in contact with a heat sink. The component holder, with the component fixed therein, can optionally be brought into thermal contact with these heat transfer devices, where the heat transfer devices and/or the component holder are designed to be appropriately repositionable.

In principle, a component can be soldered directly. As a rule, the component is surrounded in the component carrier as a component frame, used for transport and handling, so that a separate carrier component does not have to be provided. The component can be fixed in the component frame by means of a pressing or clamping device. It has, however, been found advantageous if the component holder comprises a carrier plate as a support for the component to be soldered and a pressing device which is designed to press at least the component to be soldered against the carrier plate, in particular with spring loading, where the carrier plate has at least one passageway through which the contact units pass in order to establish thermal contact between the contact surfaces of the contact units and the component to be soldered. With the aid of the component holder, the at least one component to be soldered can be fixed in a simple manner, where the component lying on the carrier plate can, for example, be a bottom plate, a substrate carrier or the like. Pressing the component lying on the carrier plate can be performed directly, i.e. through direct contact of the pressing device with the component, or indirectly, e.g. using further components that should be connected to the component lying on the carrier plate and which are in contact with the pressing device.

The use of a carrier plate simplifies the adaption of the component holder to the dimensions of the component to be soldered. The adaption of the base plate to the component or components to be soldered is also simplified. That is to say that if the component acting as a bottom plate is to be curved to compensate for thermal warping on its side facing the base plate, it is for example possible for a carrier plate to be used which has a curvature on its side facing the component that is complementary to the component curvature, whereas the other side of the carrier plate, facing the base plate, is designed planar. Universally applicable base plates can thus be used. Only the shape of the carrier plate has to be adapted to the component to be supported.

According to an advantageous embodiment of the soldering machine, the component holder and the base plate are furthermore repositionable relative to one another, where the component holder and/or the heat transfer device are designed in such a way that as the component holder and the base plate approach one another, a force is exerted by the contact units on the component to be soldered, so that the component to be soldered is lifted from the support plate.

It may in some circumstances be necessary for the pressing device to be controlled or actuated in such a way that the pressing force with which the component to be soldered is pressed against the carrier plate is reduced or removed. It is thus conceivable that the pressing force of the pressing device is exerted adjustably, for example electromagnetically, electromechanically or in some other way. As a rule, the pressing force of the pressing device exceeds a spring force or a contact pressure force from the contact units, in order to prevent unintentional lifting of the components out of the carrier plate. For example, the heat transfer device according to an embodiment already described above, can be designed such that the contact units are provided repositionable in recesses and can be lowered into a retracted position into these recesses, so that the base plate is in contact with the carrier plate over at least a large proportion of its surface. A wide-area heat exchange between the base plate and the component to be soldered lying on the carrier plate is thus achieved in this position, where this heat exchange takes place indirectly via the carrier plate. Uniform heating of the component can thus be achieved in this retracted position. The pressing force exerted by the pressing device can then be reduced, so that the component lying on the carrier plate is lifted off the carrier plate by the force exerted by the spring-loaded or elastic contact units for a subsequent cooling.

Advantageously, the component holder further has at least one heat storage strip which can make thermally conductive contact with the component to be soldered, in particular with an edge region of the component, where in particular the pressing device is designed to press the heat storage strip with spring loading onto the component to be soldered. The heat storage strip is preferably arranged on that side of the component that is to be soldered which is opposite to the carrier plate. The heat storage strip makes it possible to raise the effective thermal capacity of the component locally, and in this way to create a definable temperature gradient over the surface of the component to be soldered or instead to compensate for an unwanted temperature gradient that results from an increased heat dissipation, for example in edge regions of the component. For example, heat storage strips can be arranged at edge regions of the components to be soldered, so that when the component is cooled by contact with the base plate or with the contact units, this temperature gradient has the result that the solder in the edge regions solidifies more slowly than in the middle of the component, so that solder that is still liquid can flow from the outside to the inside during the solidification, so that the formation of cavities or cracks in the solder is avoided. The heat storage strips can, furthermore, also facilitate positioning of solder preforms or solder deposits and/or of further components. The heat storage strips can be adjusted to a curvature of the bottom plate.

For example, the component to be soldered can be lifted from the carrier plate in the manner described above in order to create this temperature gradient, so that cooling only takes place via the contact units. After the temperature has fallen below the solidus temperature at which a solder material is fully solid, this lifting can be reversed, so that the component again lies entirely on the carrier plate, as a result of which the temperature gradient is reduced, so that the component from now on is largely uniformly, and thus quickly, cooled further.

DRAWINGS

Further advantageous embodiments of the invention emerge from the description and the drawings.

Figure 2:
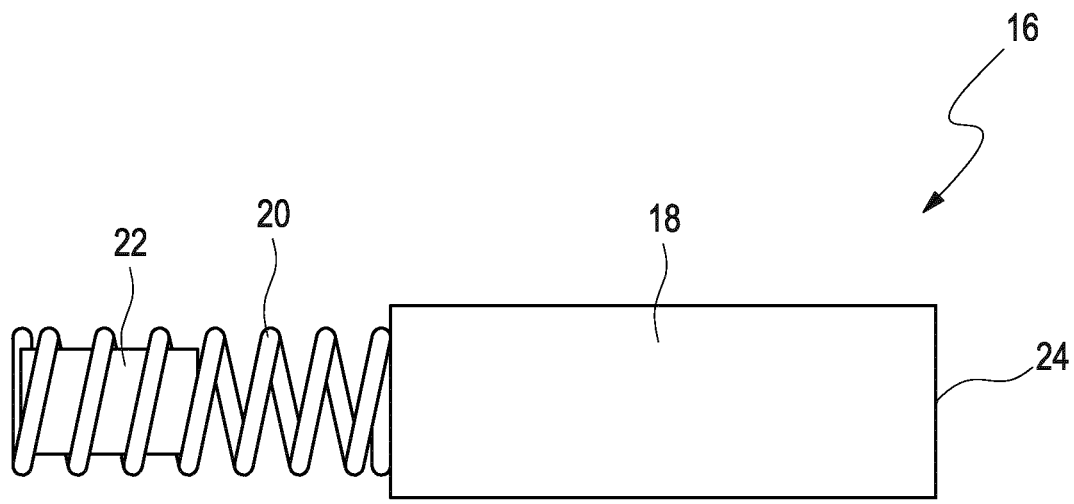
Figure 3:
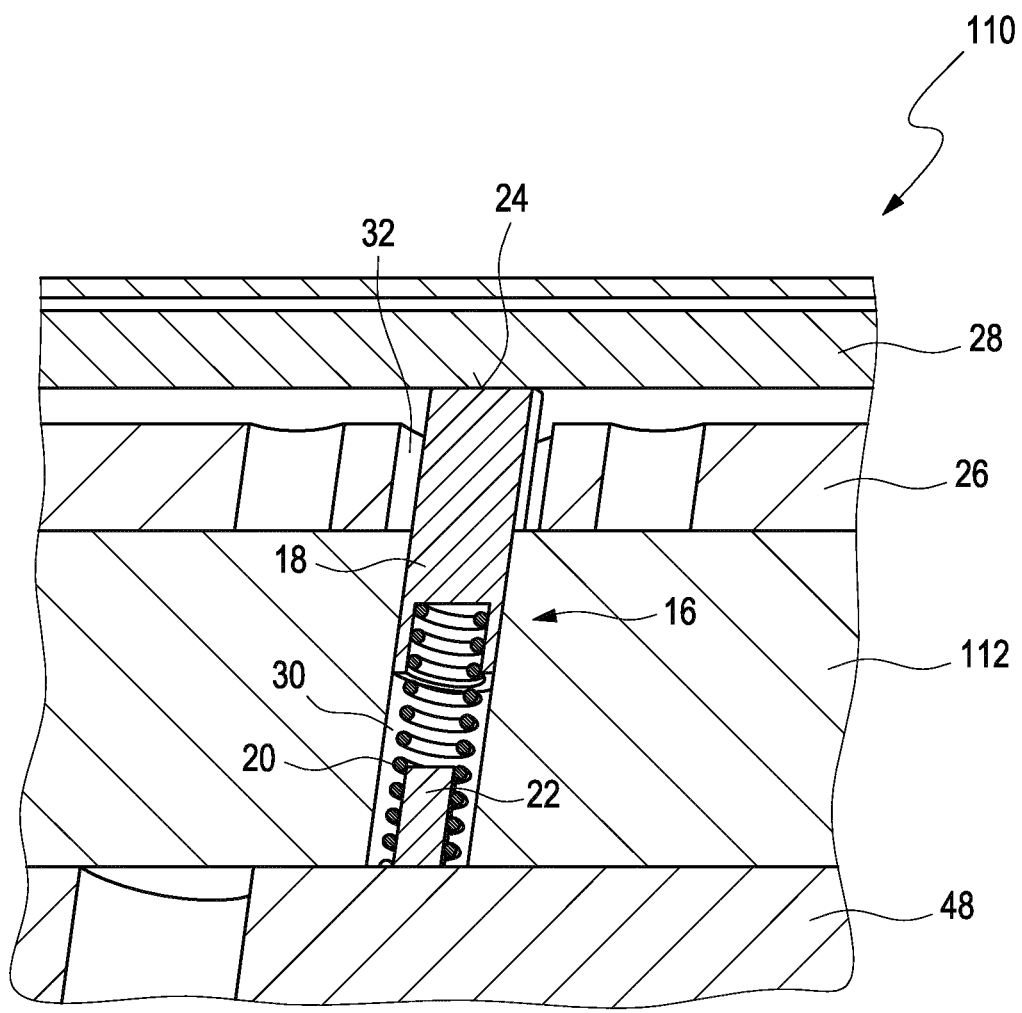
Figure 3:
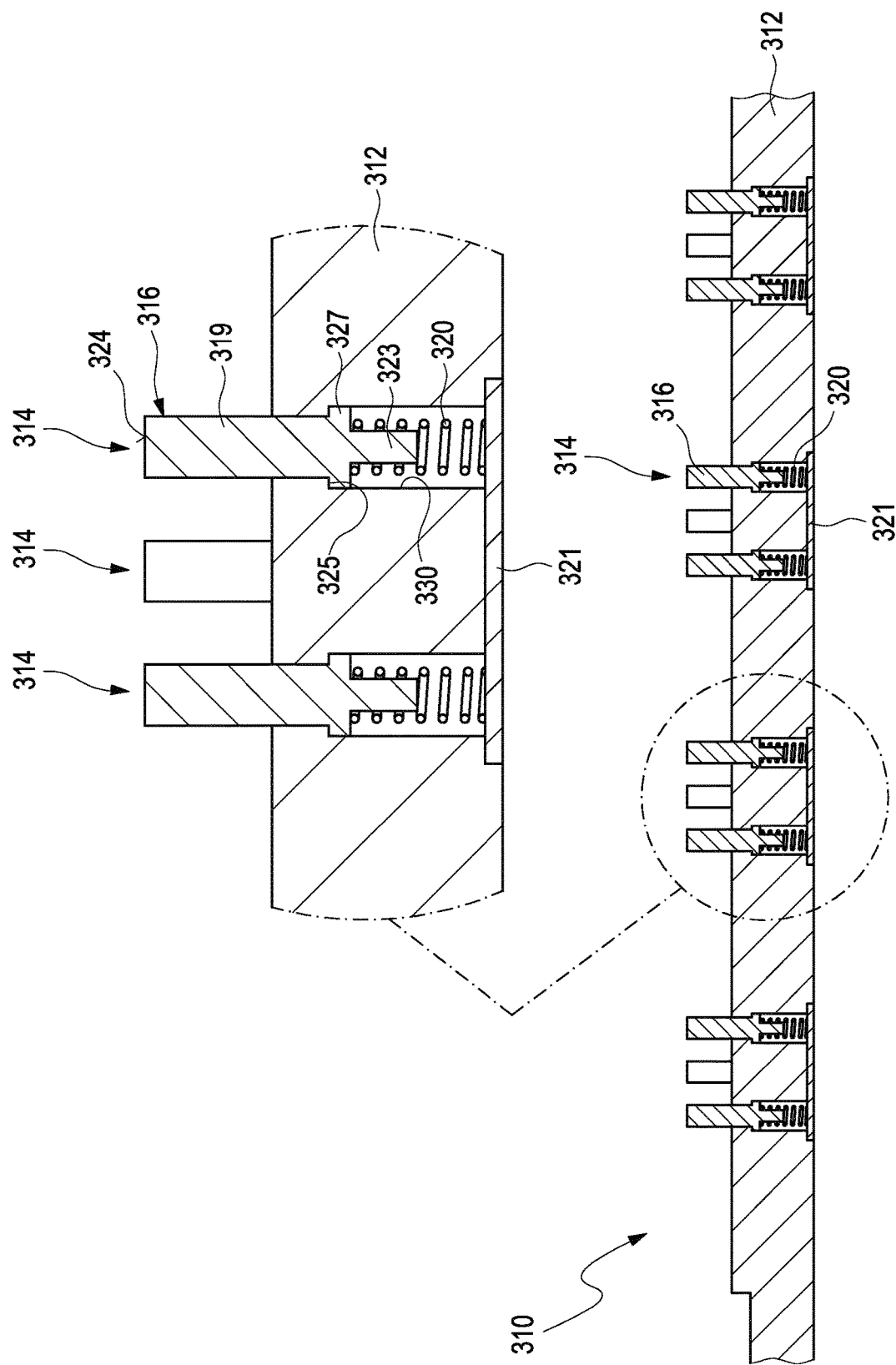
Figure 4:
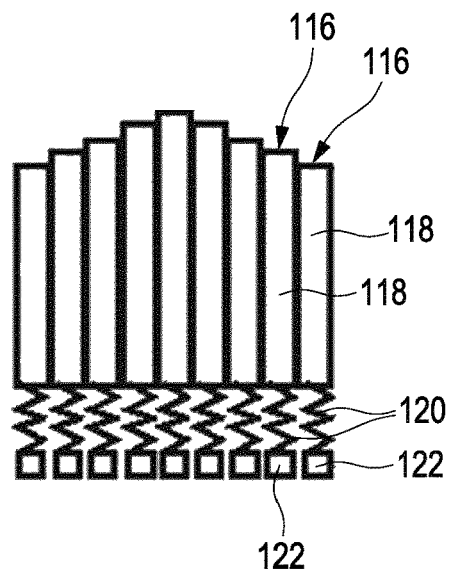
Figure 4:
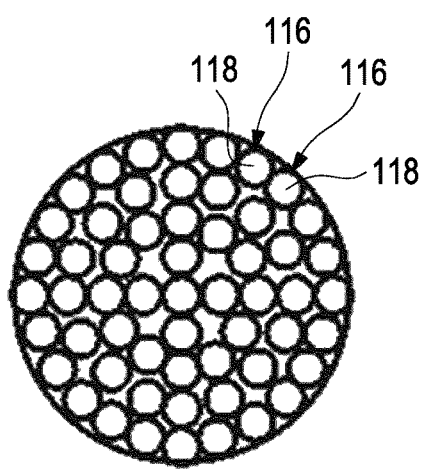
Figure 5:
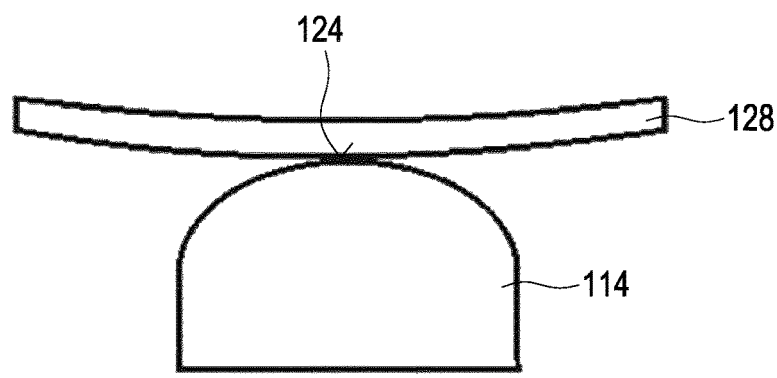
Figure 5:
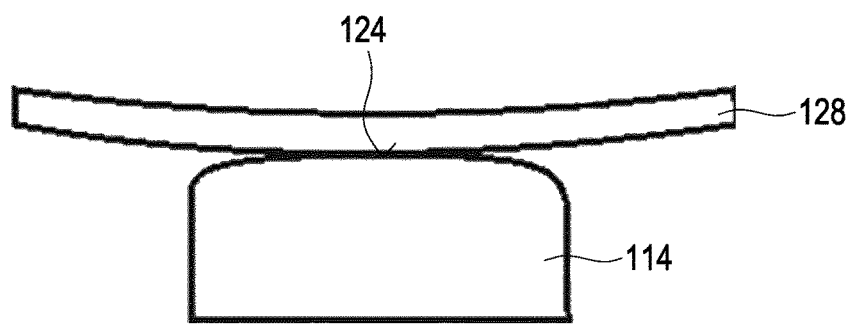
Figure 6:
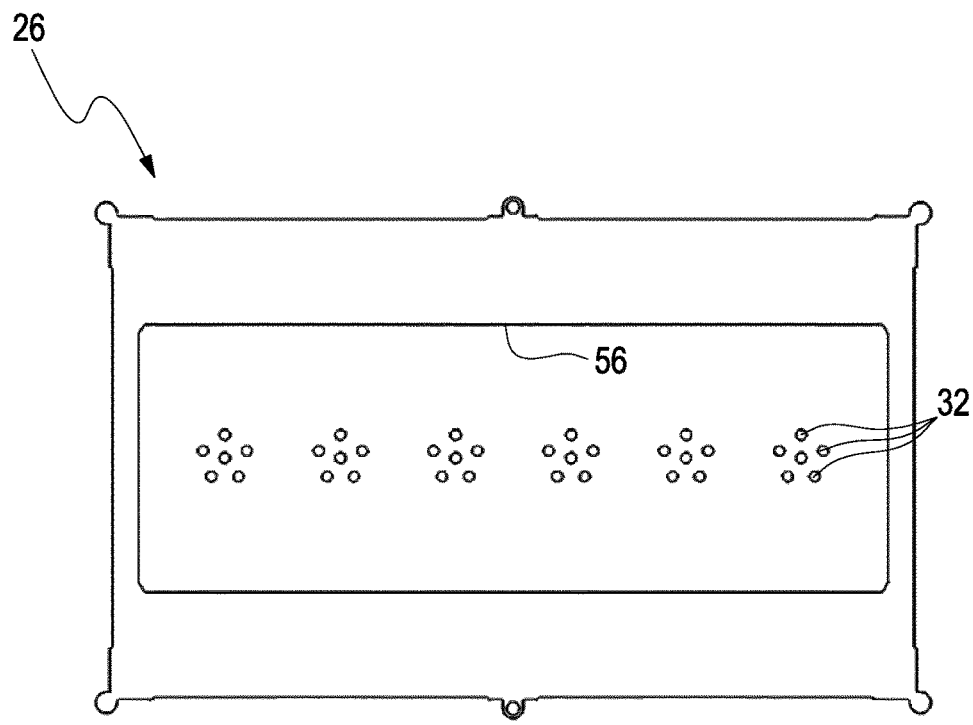
Figure 6:
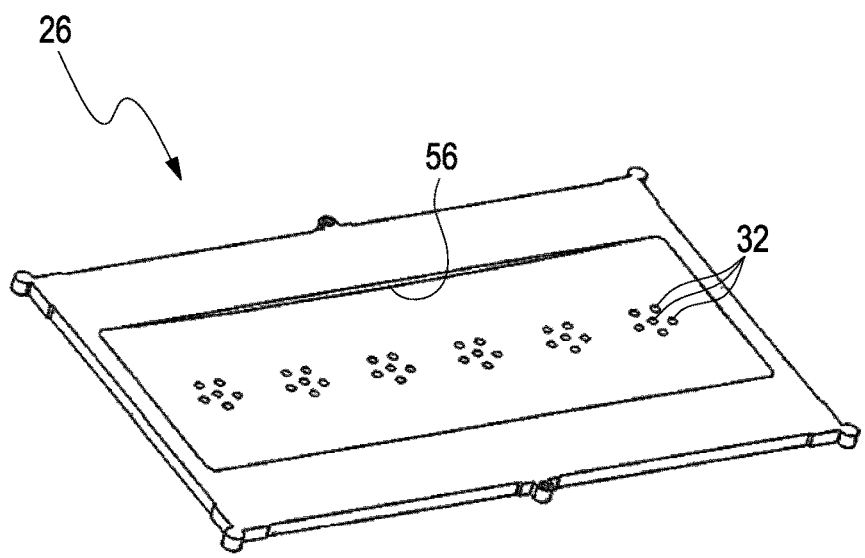
Figure 7:
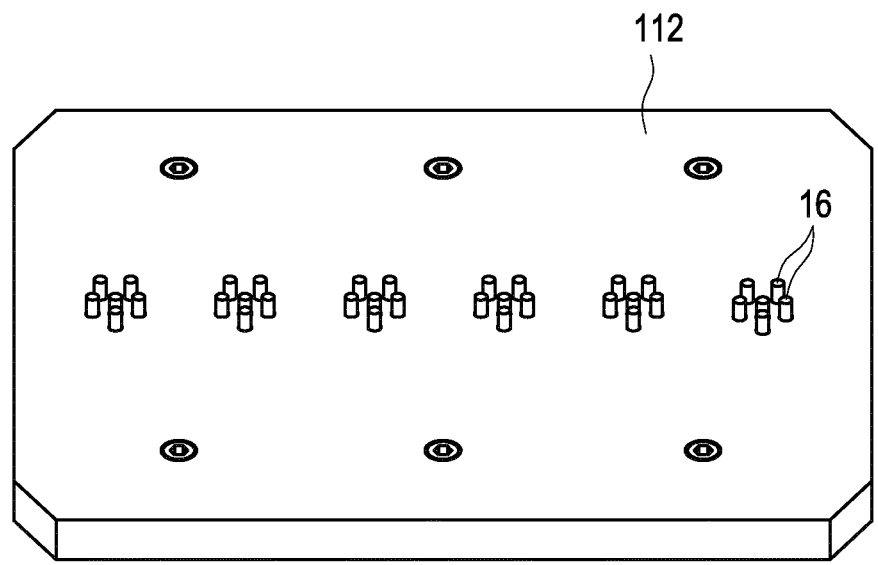
Figure 8:
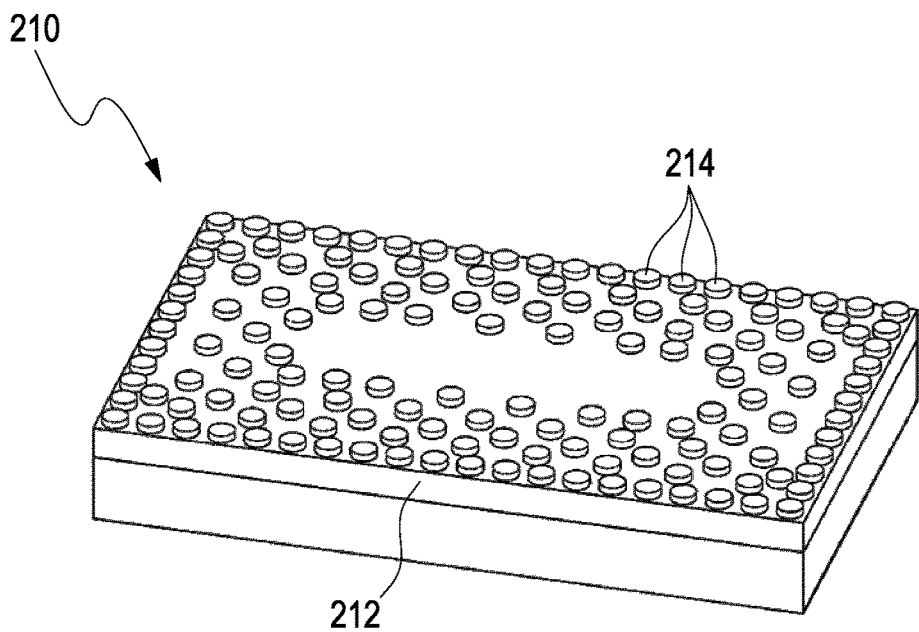
Figure 8:
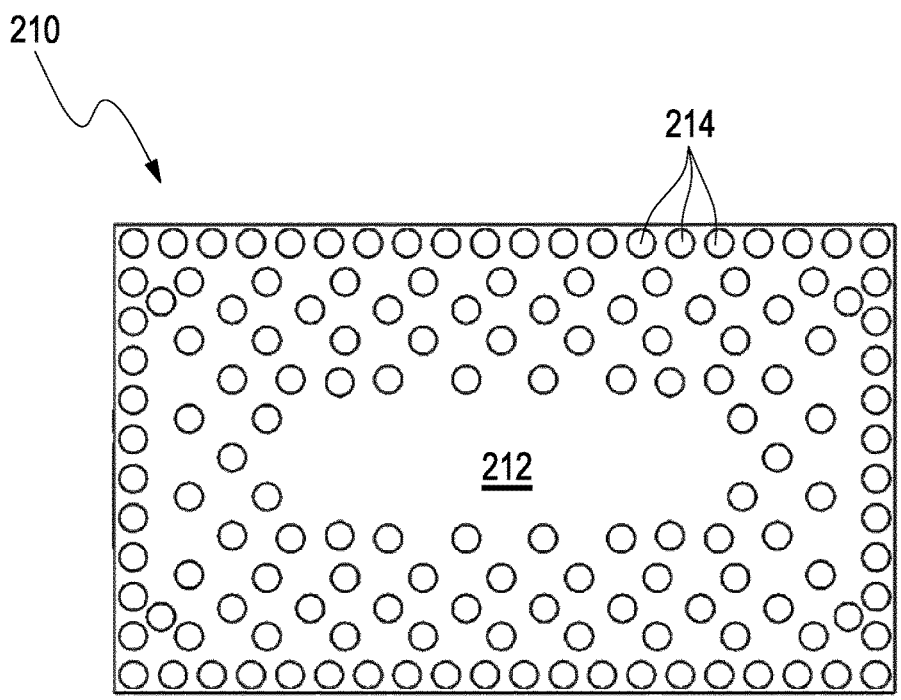
Figure 9:
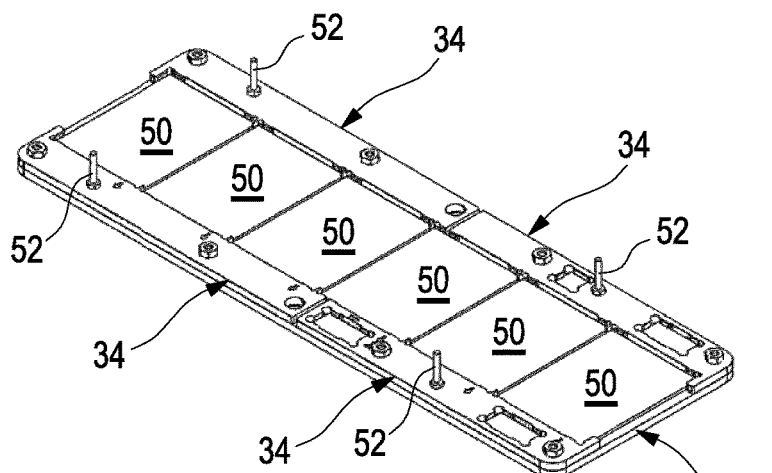
Figure 9:
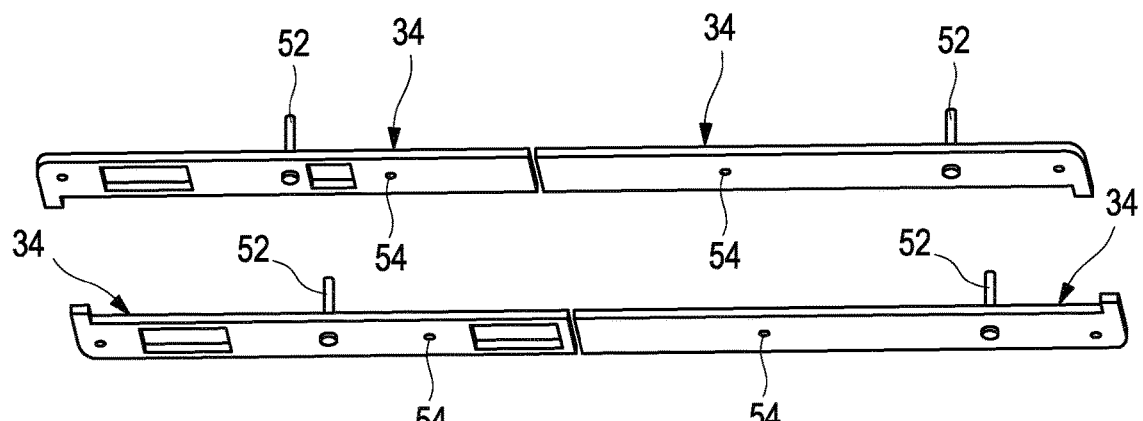
Figure 9:
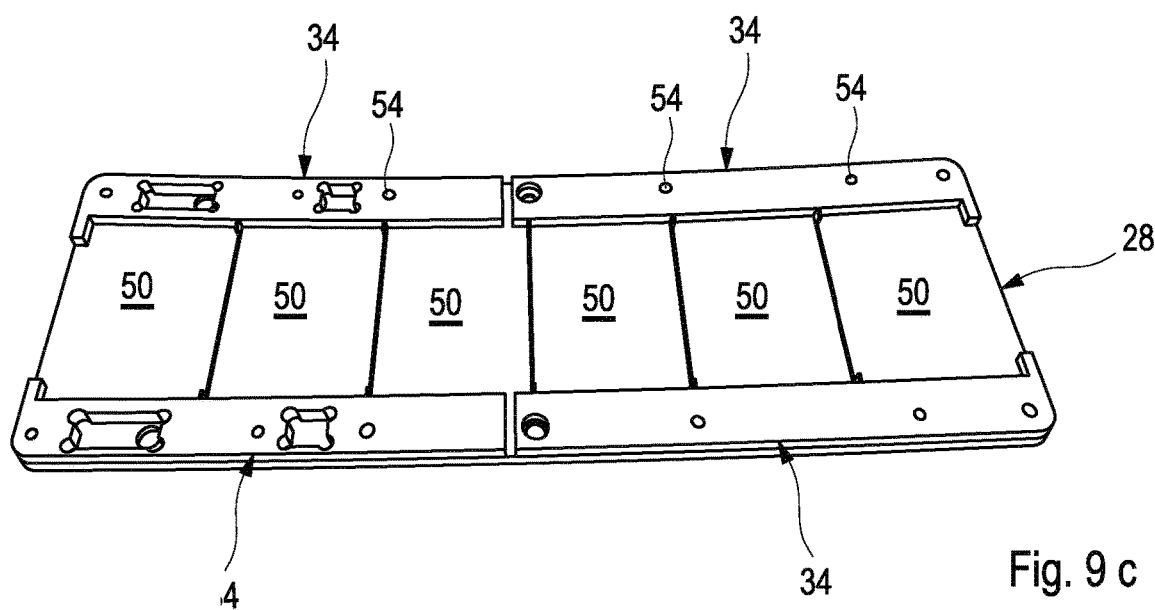
Figure 10:
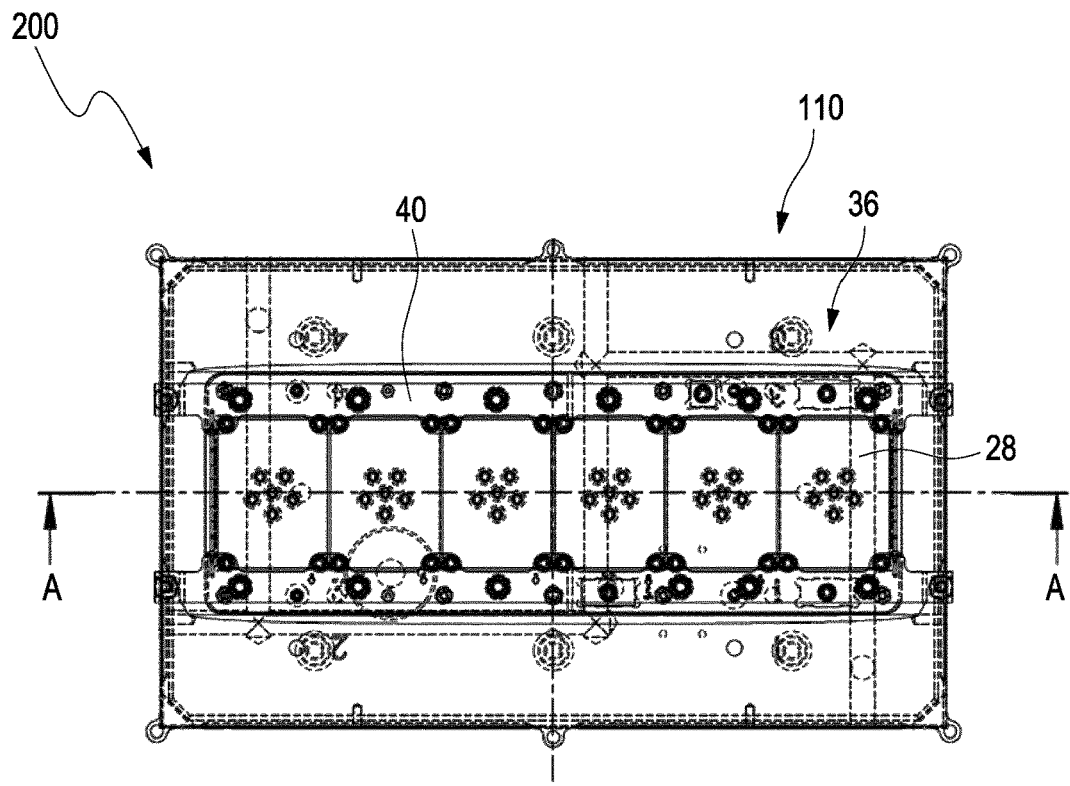
Figure 10:
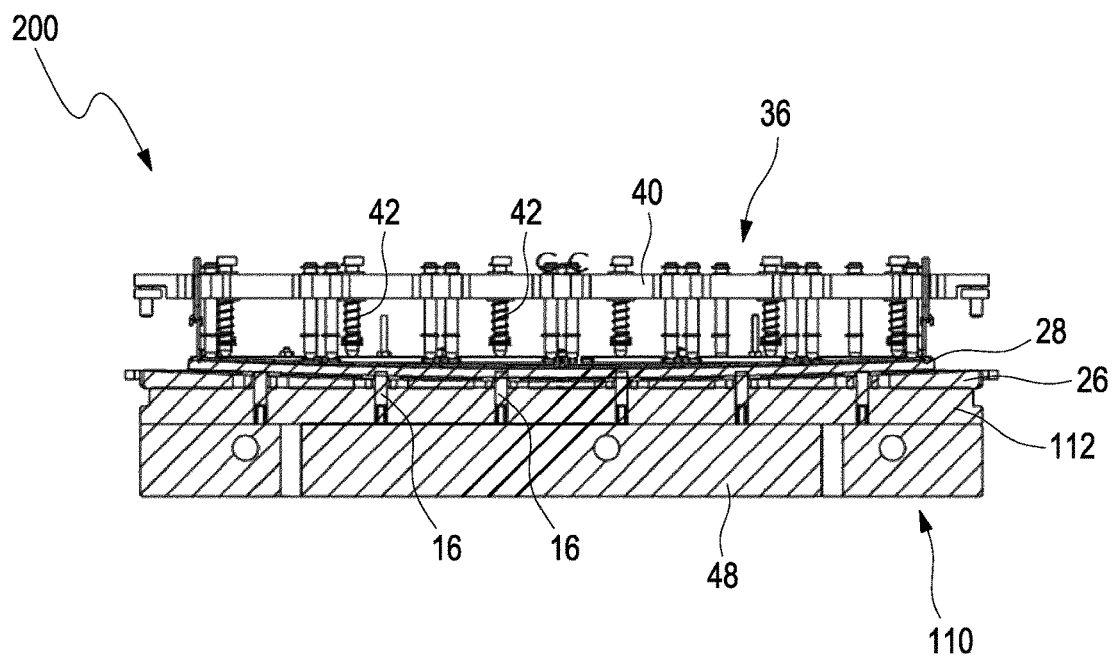
Figure 11:
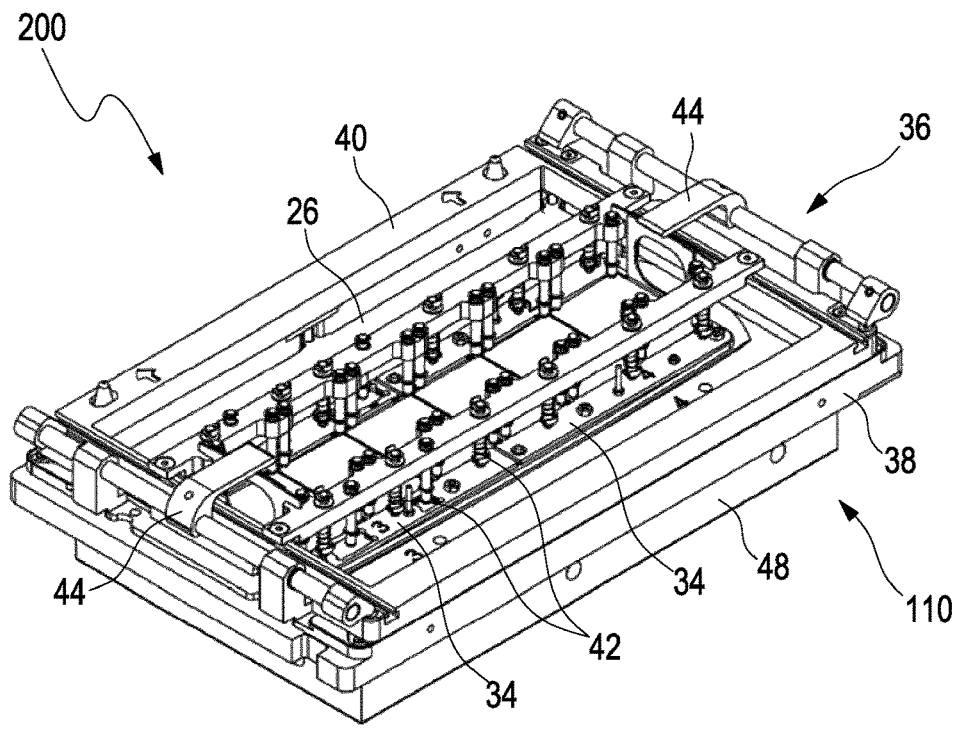
Figure 11:
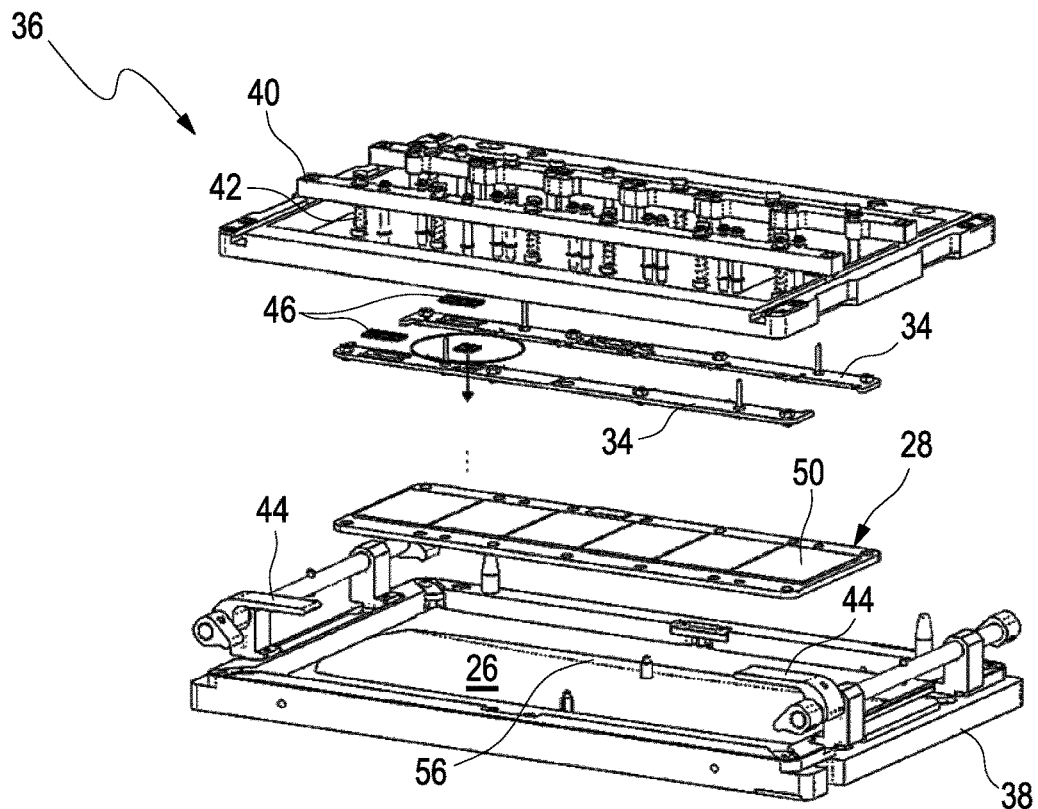
Figure 11:
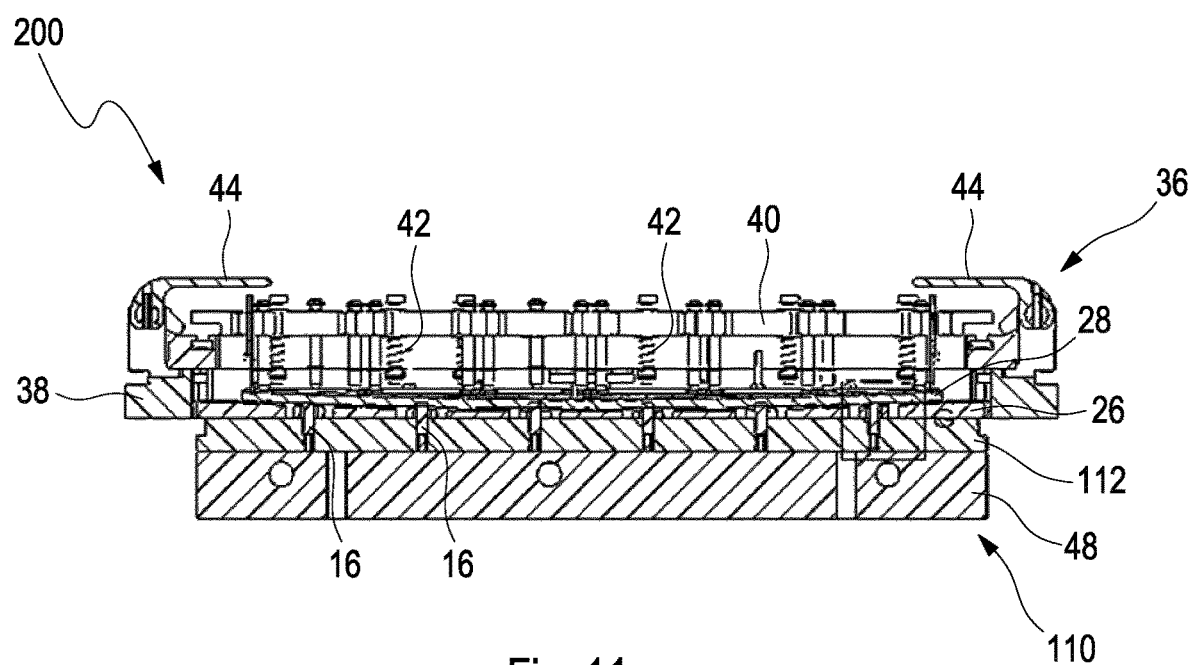

The invention is described below on the basis of exemplary embodiments, with reference to the drawings. The drawing shows in FIG. 1 a perspective views of a base plate with a plurality of contact units according to one exemplary embodiment;

FIG. 2 a plan views of a contact unit according to a further exemplary embodiment;

FIG. 3 a perspective sectional views of a heat transfer device with a contact unit according to FIG. 2, with alternative embodiments of a contact unit;

FIG. 4 a group of contact units according to a further exemplary embodiment, viewed from the side and from above;

FIG. 5 detailed views of the contact surface of a contact unit according to one exemplary embodiment of the invention;

FIG. 6 a plan view and a perspective view of a carrier plate according to one exemplary embodiment of the invention;

FIG. 7 a perspective view of a base plate according to one exemplary embodiment of the invention;

FIG. 8 a perspective view and a plan view of a base plate according to a further exemplary embodiment of the invention;

FIG. 9 a variety of perspective views of a component to be soldered and heat storage strips;

FIG. 10 plan and sectional views of a component holder and heat transfer device according to a further exemplary embodiment of the invention; and FIG. 11 perspective views and a sectional view of a component holder and a heat transfer device according to a further exemplary embodiment of the invention.

A heat transfer device 10 according to an exemplary embodiment of the present invention comprises a rectangular base plate 12 which can be brought into thermal contact with a heat source or a heat sink. Six contact units 14, also rectangular and consisting of a thermally conductive elastic material, for example of epoxy resin incorporating metal particles, or of other thermally conductive elastomer materials, are arranged on a surface of the base plate 12. The base plate 12 can be brought into contact with a component carrier, not illustrated, or directly with the component, so that the contact units 14 attached to the base plate 12 initially contact those regions of the component carrier in which a high accumulation of solder is present and which specifically are to be cooled.

FIG. 2 shows a further exemplary embodiment of a contact unit, which can be designed as a sprung contact pin 16, as shown in FIG. 3a or 3b. The contact pin 16 comprises, in accordance with the embodiment of FIG. 3a, a cylindrical, thermally conductive sleeve 18 of copper, closed on one side, in which a spring 20, for example a helical spring, is mounted. The sleeve 18 comprises a section of solid material which serves to provide a high thermal capacity for accepting/releasing and storing thermal energy, and a blind hole section to accept a spring 20. The thermal heat capacity of the sleeve 18 is dimensioned in such a way that it is alone sufficient to establish a required temperature gradient when contacting the component surface. The closed end face of the sleeve 18 constitutes a contact surface 24 which can be brought into thermal contact with a component to be soldered. In the uncompressed state illustrated in FIG. 2, the spring 20 protrudes partially out of the open end face of the sleeve 18, and is in thermal contact with the sleeve 18. Inside the spring 20, a thermally conductive stud 22 is held at the free end of the spring 20 protruding from the sleeve 18, and is also thermally connected to the spring 20. An end face of the stud 22 is flush with the end face of the free end of the spring 20.

FIG. 3a shows a heat transfer device 110 according to a further exemplary embodiment of the invention, comprising a plurality of contact pins 16 according to FIG. 2, where only one of these contact pins 16 is shown in the sectional view of FIG. 3a. The heat transfer device 110 comprises a base plate 112 which has a hole or recess 30 passing right through, in which the contact pin 16 is held. A cooling plate 48 is provided as a heat sink underneath the base plate 112. Instead of the cooling plate 48, a heating plate can also be provided as a heat source, or another plate which can optionally be operated as a heat source or as a heat sink. The contact pin 16 rests with the free end of the spring 20 on the cooling plate 48, the stud 22 being in thermal contact with the cooling plate 48, or it can be fastened to the cooling plate 48. The sleeve 18 protrudes from the upper face of the base plate 112, and extends through a passage 32 of a carrier plate 26. The function of the carrier plate 26 will be explained in more detail below.

The contact surface 24 of the sleeve 18 is in thermal contact with a component carrier or with a bottom plate 28, where further components to be soldered thereto can be arranged on the bottom plate 28. These further components can, for example, be high-current semiconductor components that can be used as half or full bridges for the rectification or inversion of electrical energy. The semiconductor components can be arranged on a ceramic substrate that has a metallised surface on which conductive tracks form electrical connections.

As can clearly be seen in FIG. 3a, the sleeve 18 can be retracted entirely into the base plate 112 against the spring force exerted by the spring 20, so that the contact surface 24 is practically flush with the other side of the base plate 112. The pin 16 stands on the stud 22. If the base plate 112 moves even closer to the carrier plate 26, the components and the bottom plate 28 could be lifted out of the carrier plates 26.

As an alternative to FIG. 3a, FIG. 3b represents a further embodiment of a heat transfer device 310 with a plurality of contact units 314. Multiple contact units are brought together to form groups that rest on a common contact plate 321. Each contact unit 314 comprises a contact pin 316 which comprises a thermally conductive stud 319. The stud 319 has a contact surface 324 and a spring tab 322 located axially opposite to it. A contact spring 320 is mounted on the spring tab 323, and rests against the contact plate 321. The contact pin 316 is held in a recess 330 of a base plate 312. The recess 330 has a region 327 that is radially constricted in the direction of the component, and the stud 319 has a radial projection 325 which, in the uncompressed state, rests against the constricted region 327 of the recess 330. The spring movement of the contact pin 316 is thus defined by the position of the radial constriction 327 of the recess 330, the length of the spring tab 323 and the position of the contact plate 321. The contact plate 321 can thermally make contact with a heating or cooling plate arranged underneath the base plate 312. A thermal decoupling, or a different temperature between the contact unit 314 and the base plate 312, can thus be achieved. The contact units 314 can be preassembled on a common contact plate 321, and inserted into a base plate 312, these being individually adaptable to solder processes.

A cooling medium or, in a configuration as a heating plate, a heating medium, can flow through the cooling plate 48 in order to bring about the desired cooling or heating effect. The heating plate can also comprise an electrical resistance heating conductor, and be electrically heated. A cooling medium, which can be gaseous or liquid, can nevertheless flow through a cooling plate, or said plate can comprise an electrical cooling element, for example a Peltier element.

FIG. 4 shows a group of contact units according to a further exemplary embodiment, which are designed as contact pins 116 with different lengths. The construction of the contact pins 116 corresponds to that of the contact pins 16 of FIG. 2, where sleeves 118 of the contact pins 116 have different lengths. The lengths of the springs 120 of the contact pins 116 can be adapted to the different lengths of the contact pins 116. Thermally conductive studs 122 can be provided at the free ends of the springs 120 that protrude out of the sleeves 118.

The group of contact pins 116 forms a circular unit, in which the lengths of the contact pins 116 decrease from the centre of the circle to the outside, so that the upper side of the group of contact pins 116 exhibits a conical contour. The contact pins 116 can nevertheless be of the same length, and the lengths of the springs 120 vary correspondingly. As this group of contact pins 116 approaches a component, a central region of the component is contacted and cooled first of all. As the approach continues, the contacted region grows continuously. A finely stepped control of the temperature gradient can be achieved in this way, so that a spatially and temporally precise cooling of the components to be soldered can be achieved.

In accordance with exemplary variations, the contact areas 24 of the contact pins 16 (FIG. 2) or 116 (FIG. 4) can in particular be designed elastic and/or curved.

FIG. 5 shows a contact unit 114 according to a further exemplary embodiment, which, similarly to the contact units 14 of the heat transfer device of FIG. 1, can be arranged on a base plate (not illustrated). The contact unit 114 consists of an elastic and thermally conductive material, and, when in an uncompressed state, has an elliptically shaped contact surface 124. As the result of an approach of the base plate to a component carrier or to a bottom plate 128, only a small region of a contact surface 124 of the contact unit 114 initially comes into thermal contact with the bottom plate 128. As the approach continues, the contact unit 114 deforms, so that the region of the contact surface 124 that is in contact with the bottom plate 128 increases continuously.

A soldering machine 200 according to an exemplary embodiment of the present invention is described below with reference to FIGS. 10 and 11. The soldering machine 200 comprises a heat transfer device 110 (see FIG. 3a or FIG. 3b) as well as a component holder 36 in which the components to be soldered can be fixed. The components to be soldered comprise a bottom plate 28 as a component carrier, as well as further components 46 that are to be soldered to the bottom plate 28. The bottom plate 28 has six solder fields 50, arranged in a row, on which the components 46 are arranged. Solder, for example in the form of solder paste or stamped solder elements known as solder preforms, can be provided between the components 46 and the bottom plate 28 in a fluxless process. Alternatively, a carrier frame 38 with integrated, small-area receptacles for the components to be soldered, or with correspondingly small bottom plates, can be used instead of the bottom plate 28, or the bottom plate 28, or a plurality of bottom plates, can be suspended from a pressing frame 40 by means of pins, i.e. positioned in a floating manner.

FIG. 7 shows the base plate 112 of the heat transfer device 110. The base plate 112 comprises six groups of contact pins 16, where each group comprises six concentrically arranged contact pins 16. The arrangement of the groups of contact pins 16 is matched to the arrangement of the solder fields 50 of the bottom plate 28.

The component holder 36 comprises a carrier frame 38 in which the carrier plate 26 is held. The bottom plate 28 is placed on the carrier plate 26. The component holder 36 further comprises a pressing frame 40 which comprises a large number of spring-mounted pressure pins 42. The pressing frame 40 can be fixed in position on the carrier frame 38 by means of latches 44 arranged on the carrier frame 38.

As can be seen particularly in FIG. 6, the carrier plate 26 has passages 32 that are aligned with the contact pins 16, so that the contact pins 16 can come into thermal contact with the bottom plate 28 through these passages 32 of the carrier plate 26.

Heat storage strips 34 can be arranged at the edge regions of the bottom plate 28, and these can be continuous or—as illustrated—divided. The heat storage strips 34 have locating pins 52 and locating holes 54 which serve to align or to fasten the heat storage strips 34 to the bottom plate 28 or to the pressing frame 40. The heat storage strips 34 serve to provide a local increase in the heat storage capacity, thereby compensating for an increased temperature loss of the bottom plate 28 at its edge regions or forming a temperature gradient over the base plate, so that the edge regions cool down more slowly. As a result of this temperature gradient, the solder in the middle of the bottom plate 28 which is still liquid cools down first during the cooling process and solidifies, whereas the solder in the region further outside is still liquid, and can flow inwards from there in order to prevent the formation of cavities or cracks. At the end of the cooling process, the solder in the edge regions of the bottom plate 28 has also reached its solidification point.

As can be seen clearly particularly in FIGS. 10b and 11c, the bottom plate 28 is pre-curved, in order to compensate for stresses arising as a result of the soldering process. The aim is that, after the soldering process is complete and cooling has occurred, the bottom plate 28 is flat, which is achieved by a different coefficient of thermal expansion of the components to be soldered which, when cooling from the curved shape, distort into a planar alignment in a manner similar to a bimetal strip.

In order to ensure a good thermal contact between the carrier plate 26 and the bottom plate 28, the carrier plate 26 is provided with a convex milling or recess 56, whose curvature is designed to be complementary to the curvature of the plate 28 (see in particular FIGS. 6a and 11b). The side of the carrier plate 26 opposite to the recess 56 is, like the upper side of the base plate 112, also preferably flat, in order to ensure a full-area contact between these plates.

When the bottom plate 28 is inserted into the component holder 36 and the pressing frame 40 is fastened by means of the latches 44 to the carrier frame 38, the bottom plate 28 is pressed by means of the pressure pins 42 against the carrier plate 26, where the pressing force is at least partially transmitted indirectly through the components 46 and the heat transfer strips 34, which are thus also pressed against the bottom plate 28.

As the heat transfer device 110 approaches the carrier plate 26, at first only the contact pins 16 come into thermal contact with the bottom plate 28, so that a local cooling in the region of the contact pins 16 is achieved. As the approach continues, the distance between the contact surfaces 24 of the contact pins 16 and the base plate 112 decreases, so that finally the contact pins 16 are to a large extent held in the recesses 30 of the base plate 112, and finally a full-area contact is established between the heat transfer device 110 and the carrier plate 26, and hence also with the bottom plate 28 that is in thermal contact with the carrier plate 26, in order to achieve a large-area cooling of the bottom plate 28. As the heat transfer device 110 approaches the carrier plate 26, it is possible for the bottom plate 28 to be lifted out of the carrier plate 26.

In order to interrupt the thermal contact between the carrier plate 26 and the bottom plate 28, it is possible for the latches 44 to be partially or fully released, so that the pressing force exerted by the pressure pins 42 is reduced or even removed. Alternatively, the pressing force of the pressure pins 42 can be selected such that as the heat transfer device 110 approaches the carrier plate 26, the bottom plate 28 is lifted as soon as the contact pins 16 are fully retracted and the base plate 112 is moved further against the carrier plate 26. As the heat transfer device 110 approaches the component holder 36, the bottom plate 28 is lifted by the contact pins 16 from the carrier plate 26, since from now on the opposing force that compresses the springs 20 of the contact pins 16 is absent, or at least is so small that the contact pins 16 only enter slightly, if at all, the recesses 30. Due to the absence of thermal contact of the bottom plate 28 with the carrier plate 26, a more precisely controlled cooling, or a steeper temperature gradient, is possible in the region of the places that are contacted by the contact pins 16.

FIG. 8 shows a heat transfer device 210 according to a further exemplary embodiment of the invention. The heat transfer device 210 comprises a rectangular base plate 212, on the upper face of which a large number of schematically illustrated contact units 214 are arranged. The contact units 214 can correspond to the contact pins 16 (FIGS. 2 and 3) or to the contact units 114 (FIG. 5) formed of elastic material. The area density with which the contact units 214 are arranged on the base plate 212 is maximum along the edges of the base plate 212, and decreases inwards, i.e. the spacing between the contact units 214 increases from the outside to the inside. An inner region of the base plate 212 is free from contact units 214.

A heat transfer device 210 of this type can advantageously be employed as a heating plate or a heat source, in order to prevent a temperature gradient on a bottom plate (not illustrated) in thermal contact with the heat transfer device 210 during the heating process. The aim here is to prevent a temperature gradient that occurs naturally. As a rule, a heated body in a colder environment is cooler at the edge regions than in the centre, in this case the edges of the carrier plate 26 or bottom plate 28. Due to the higher heat transfer at the edge, this temperature drop can be counteracted, and in this way a greater homogeneity of the heat distribution achieved when heating. As a rule this has little effect on the cooling process.

When cooling a bottom plate 28 (FIG. 9) provided with heat storage strips 34 using a heat transfer device 10 according to FIG. 1, the six rectangular contact units 14 can contact central regions of the bottom plate 28, while components arranged on the bottom plate are connected to the bottom plate 28 through the heat storage strips 34 arranged at the edge. At an initial temperature of about 280° C., a cooling to about 200° C. can be achieved by selective cooling in the region of the contact units 14, while in the outer regions, and in particular at the heat storage strips 34, the temperature is between about 5° C. to 20° C. higher. After a considerable time, the individual components have cooled to a temperature below 100° C., whereas the edge region, in particular the heat storage strips 34, can still have a significantly higher temperature. In this temperature range, the control of the gradient is no longer significant, in addition to which the temperature difference between the central and edge regions falls as the absolute temperature falls. As a result of this, soldered connections cool and solidify from the inside towards the outside, and thus no mechanical stresses can occur and any cavities or cracks that arise can be filled by an inflow of still-hot solder from the outside. A significantly improved quality in solder connections can be achieved through this.

It appears advantageous to use contact units 214 that are arranged at the edge of the components to be heated or of the bottom plate 28, 128 for heating. Contact units 14, 114, or contact pins 16, 116, can be arranged at the central regions of the component or of the bottom plate 28 that are wetted by solder for cooling.

Advantageously, the contact units 214 of the base plate 212 for heating, and the contact units 14, 114 or contact pins 16, 116 of the base plate 12, 112 for cooling, can be arranged in a complementary manner with respect to the component or of the bottom plate 28, 128.

LIST OF REFERENCE NUMERALS 10, 110, 210, 310 Heat transfer device
12, 112, 212. 312 Base plate
14, 114, 214, 314 Contact unit
16, 116, 316 Contact pin
18, 118 Sleeve
319 Stud
20, 120, 320 Spring
321 Contact plate
22, 122 Stud
323 Spring tab
24, 124, 324 Contact surface
325 Radial stud projection
26 Carrier plate
327 Radial recess constriction
28, 128 Bottom plate
30, 330 Recess
32 Passage
34 Heat transfer strip
36 Component holder
38 Carrier frame
40 Pressing frame
42 Pressure pin
44 Latch
46 Component
48 Cooling plate
50 Solder field
52 Locating pin
54 Locating hole
56 Recess
200 Soldering machine

The invention claimed is:

1. A heat transfer device for thermal coupling of a component to be soldered with a heat source or a heat sink in a soldering machine, comprising:
    a heat source or a heat sink, and
    at least one base plate, said base plate being in thermally conductive contact at least with the heat source or the heat sink,
    said base plate comprising at least two contact units having respective contact surfaces, said contact surfaces being thermally contactable to the component, said contact units being designed in such a way that relative distances between the contact surfaces and the surface of the base plate facing the component are changeable,
    wherein the distance between the base plate and the component is changeable,
    said contact units being movable wherein said relative distances between the contact surfaces and the surface of the base plate facing the component are changeable depending on a change in the contact pressure with which the base plate is pressed against the component caused by a change in the distance between the base plate and the component, said contact units being repositionable in recesses that are provided in the base plate, said contact units are repositionable into a retracted position in which the contact surfaces of the contact units are flush with the surface of the base plate facing the component, and wherein a respective contact unit comprises a thermally conductive sleeve, closed on one side, whose closed end face faces the component to be soldered, and a spring is housed in said sleeve, the spring is thermally in contact with said sleeve, where a thermally conductive stud is held in an interior of the spring at its free end that protrudes from said sleeve, said stud being thermally connected to the spring.

2. The heat transfer device according to claim 1, wherein the contact units are formed of an elastic and thermally conductive material that is provided on the side of the base plate facing the component to be soldered.

3. The heat transfer device according to claim 1, wherein a respective contact unit comprises a contact pin having the contact surface and adjustable relative to the base plate.

4. The heat transfer device according to claim 3, wherein an elastic and thermally conductive material is applied to an end face of the contact pin.

5. The heat transfer device according to claim 3, wherein the contact pins are arranged in at least one group, each comprising a plurality of contact pins, where, in an uncompressed state, the distances of the contact surfaces of the contact pins of a group to the base plate decrease from the inside to the outside in relation to the positions of the contact pins in the group.

6. The heat transfer device according to claim 1, wherein the base plate is curved on its side facing the component to be soldered.

7. A vacuum soldering machine, with at least one heat transfer device according to claim 1, and with a component holder, in which at least one component to be soldered is fixable, wherein the component holder and the base plate are repositionable relative to one another wherein the contact surfaces of the contact units can optionally maker thermally conductive contact with the component to be soldered, and the relative distances between the contact surfaces and the surface of the base plate, facing the component are changeable.

8. The soldering machine according to claim 7, wherein the component holder comprises a carrier plate as a support for the component to be soldered and a pressing device which is designed to press at least the component to be soldered against the carrier plate, where the carrier plate has at least one passageway through which the contact units pass in order to establish thermal contact between the contact surfaces of the contact units and the component to be soldered.

9. The soldering machine according to claim 7, wherein the component holder and the base plate are repositionable relative to one another, where the component holder or the heat transfer device are designed wherein the component holder and the base plate approach one another, a force is exerted by the contact units to the component to be soldered, so that the component to be soldered is lifted from the carrier plate.

10. The soldering machine according to claim 7, wherein the component holder has at least one heat storage strip which can make thermally conductive contact with the component to be soldered.

11. The heat transfer device according to claim 1, wherein the contact units are formed of an elastic and thermally conductive material that is provided on the side of the base plate facing the component to be soldered.

12. The heat transfer device according to claim 1, wherein a respective contact unit comprises a contact pin having the contact surface and adjustable relative to the base plate.

13. The heat transfer device according to claim 2, wherein a respective contact unit comprises a contact pin having the contact surface and adjustable relative to the base plate.

14. A heat transfer device for thermal coupling of a component to be soldered with a heat source or a heat sink in a soldering machine, comprising:

a heat source or a heat sink, and at least one base plate, said base plate being in thermally conductive contact at least with the heat source or the heat sink, said base plate comprising at least two contact units having respective contact surfaces, said contact surfaces being thermally contactable to the component, said contact units being designed in such a way that relative distances between the contact surfaces and the surface of the base plate facing the component are changeable, wherein the distance between the base plate and the component is changeable, said contact units being movable wherein said relative distances between the contact surfaces and the surface of the base plate facing the component are changeable depending on a change in the contact pressure with which the base plate is pressed against the component caused by a change in the distance between the base plate and the component, said contact units being repositionable in recesses that are provided in the base plate, said contact units are repositionable into a retracted position in which the contact surfaces of the contact units are flush with the surface of the base plate facing the component, wherein a respective contact unit comprises a contact pin having the contact surface being adjustable relative to the base plate, said contact pins being spring-mounted, and wherein a respective contact pin comprises a thermally conductive sleeve, closed on one side, said closed end face faces the component to be soldered, and a spring, said spring being housed in the sleeve and protruding, at least when in an uncompressed state, partially out of the open end face of the sleeve and is thermally in contact with the sleeve, wherein a thermally conductive stud is held in an interior of the spring at its free end that protrudes from the sleeve, said stud being thermally connected to the spring, wherein advantageously an end face at the end of the stud is flush with the end face of the free end of the spring or protrudes out of the spring, or in that a respective contact pin has a thermally conductive stud, whose end face faces the component to be soldered, and wherein at the stud a spring is held on a spring tab of the stud, wherein the spring rests, together with other contact pins, on a contact plate at the side facing away from the spring tab, and where the stud has a radial projection at the seat of the spring tab, which, when the spring is in the uncompressed state, rests on a radial constriction of the recess of the base plate.

15. A heat transfer device for thermal coupling of a component to be soldered with a heat source or a heat sink in a soldering machine, comprising:

a heat source or a heat sink, and at least one base plate, said base plate being in thermally conductive contact at least with the heat source or the heat sink, said base plate comprising at least two contact units having respective contact surfaces, said contact surfaces being thermally contactable to the component, said contact units being designed in such a way that relative distances between the contact surfaces and the surface of the base plate facing the component are changeable, wherein the distance between the base plate and the component is changeable, said contact units being movable wherein said relative distances between the contact surfaces and the surface of the base plate facing the component are changeable depending on a change in the contact pressure with which the base plate is pressed against the component caused by a change in the distance between the base plate and the component, said contact units being repositionable in recesses that are provided in the base plate, said contact units are repositionable into a retracted position in which the contact surfaces of the contact units are flush with the surface of the base plate facing the component, and wherein a respective contact unit comprises a contact pin comprising a thermally conductive stud with a contact surface facing the component to be soldered, and a spring tap located axially opposite to it, a spring is thermally in contact with said spring tap and the free end of the spring rests on a contact plate.

16. The heat transfer device according to claim 15, wherein the contact pins are formed of an elastic and thermally conductive material that is provided on the side of the base plate facing the component to be soldered.

17. The heat transfer device according to claim 15, wherein a respective contact pin is adjustable relative to the base plate.

18. The heat transfer device according to claim 17, wherein an elastic and thermally conductive material is applied to an end face of the contact pin.

* * * * *